United States Patent
Bruggink

(10) Patent No.: US 7,791,726 B2
(45) Date of Patent: Sep. 7, 2010

(54) TOOL POSITIONING AND/OR IDENTIFICATION DEVICE AND METHOD

(75) Inventor: Gerrit Bruggink, Hengelo (NL)

(73) Assignee: Wila B.V., Lochem (NL)

( * ) Notice: Subject to any disclaimer, the term of this patent is extended or adjusted under 35 U.S.C. 154(b) by 335 days.

(21) Appl. No.: 11/810,686

(22) Filed: Jun. 6, 2007

(65) Prior Publication Data

US 2008/0043238 A1    Feb. 21, 2008

(30) Foreign Application Priority Data

Jun. 7, 2006    (EP)    ................................. 06011700

(51) Int. Cl.
G01B 11/00    (2006.01)
G01C 1/00    (2006.01)

(52) U.S. Cl. ....................... 356/399; 356/152.3; 72/31.1

(58) Field of Classification Search ............. 356/152.3, 356/153, 399–400, 614, 622; 72/31.1
See application file for complete search history.

(56) References Cited

U.S. PATENT DOCUMENTS

| | | | |
|---|---|---|---|
| 1,425,727 A | 5/1922 | Wallstrom |
| 1,708,854 A | 4/1929 | Stahlhut |
| 2,468,055 A | 4/1949 | Gibler |
| 2,570,726 A | 10/1951 | Smith |
| 2,812,080 A | 11/1957 | Campos |
| 4,355,940 A | 10/1982 | Derickson |
| 5,009,098 A | 4/1991 | van Merksteijn |
| 5,022,256 A | 6/1991 | van der Meulen |
| 5,082,415 A | 1/1992 | Hayashi |
| 5,103,665 A | 4/1992 | van Merksteijn |
| 5,245,854 A | 9/1993 | Bruggink et al. |
| 5,908,374 A | 6/1999 | Kato |
| 6,003,360 A | 12/1999 | Runk et al. |
| 6,264,417 B1 | 7/2001 | Salsburg |
| 6,327,884 B1 | 12/2001 | Wills |
| 6,467,327 B1 | 10/2002 | Runk et al. |
| 6,516,649 B1 | 2/2003 | Mika et al. |
| 6,557,390 B2 | 5/2003 | Runk et al. |

(Continued)

FOREIGN PATENT DOCUMENTS

DE    39 33 736 A1    6/1990

(Continued)

OTHER PUBLICATIONS

Wilson Tool, Mar. 2006 Brochure, published in Mar. 2006 by Wilson Tool International, Inc. White Bear Lake, Minnesota, USA.

(Continued)

Primary Examiner—Tarifur Chowdhury
Assistant Examiner—Tara S Pajoohi
(74) Attorney, Agent, or Firm—The Webb Law Firm

(57) ABSTRACT

A device for exchanging data, such as a position or an identification, between a tool and a tool receiving structure. The device includes: an elongated track of sensors arranged in the receiving structure; and at least one sensor activating element arranged on the tool. The invention further relates to a method for exchanging data between a tool and a tool receiving structure, including: providing a device for exchanging data; activating at least one sensor activating element; and checking the track of sensors for activation of a sensor.

11 Claims, 3 Drawing Sheets

U.S. PATENT DOCUMENTS

| | | | |
|---|---|---|---|
| 6,564,611 | B2 | 5/2003 | Harrington et al. |
| 6,732,564 | B2 | 5/2004 | Runk et al. |
| 6,848,291 | B1 | 2/2005 | Johnson et al. |
| 6,928,852 | B2 | 8/2005 | Enderink |
| 7,004,008 | B2 | 2/2006 | Harrington et al. |
| 7,021,116 | B2 | 4/2006 | Harrington et al. |
| 2003/0121303 | A1* | 7/2003 | Lanni et al. .................. 72/31.1 |
| 2004/0136012 | A1* | 7/2004 | Kyle et al. .................. 356/614 |
| 2005/0190379 | A1* | 9/2005 | Rubach ...................... 356/614 |
| 2005/0193792 | A1* | 9/2005 | Yost et al. .................... 72/17.2 |
| 2006/0098203 | A1* | 5/2006 | Kalveram ................... 356/446 |

FOREIGN PATENT DOCUMENTS

| | | | |
|---|---|---|---|
| DE | 20 2005 010693 U1 | | 9/2005 |
| EP | 0 427 661 | B1 | 5/1991 |
| EP | 0 494 714 | A1 | 7/1992 |
| EP | 0 974 422 | A1 | 1/2000 |
| EP | WO2004048881 | * | 6/2004 |
| EP | 1 600 257 | A | 11/2005 |
| EP | 1 698 408 | A | 9/2006 |
| EP | 1 864 752 | A1 | 12/2007 |
| NL | 9100034 | | 8/1992 |
| WO | WO 02/102544 | A | 12/2002 |
| WO | WO 2004/024361 | A | 3/2004 |

OTHER PUBLICATIONS

M. Karkkainen, Timo Ala-Risku and Petri Kiianlinna; "Item Identification. Applications and Technologies"; TAI Research Center, Helsinki, FI, 2001; pp. 1-60 (XP-002333320).

* cited by examiner

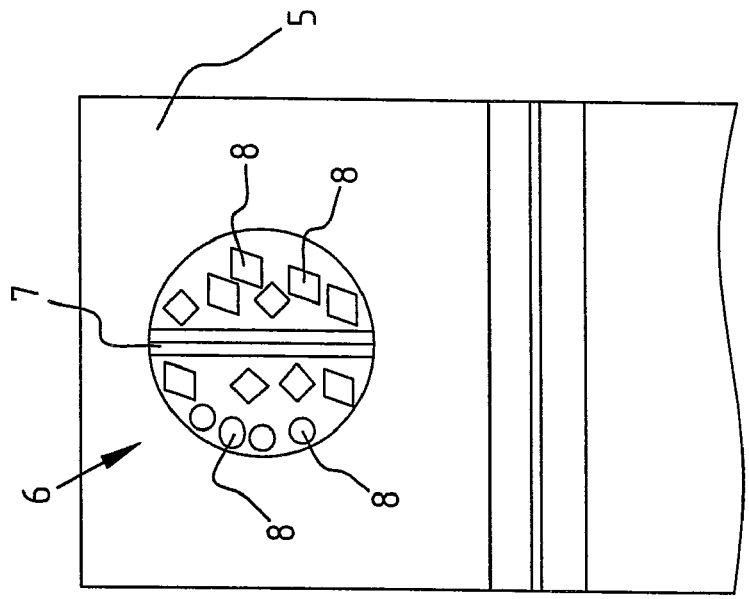
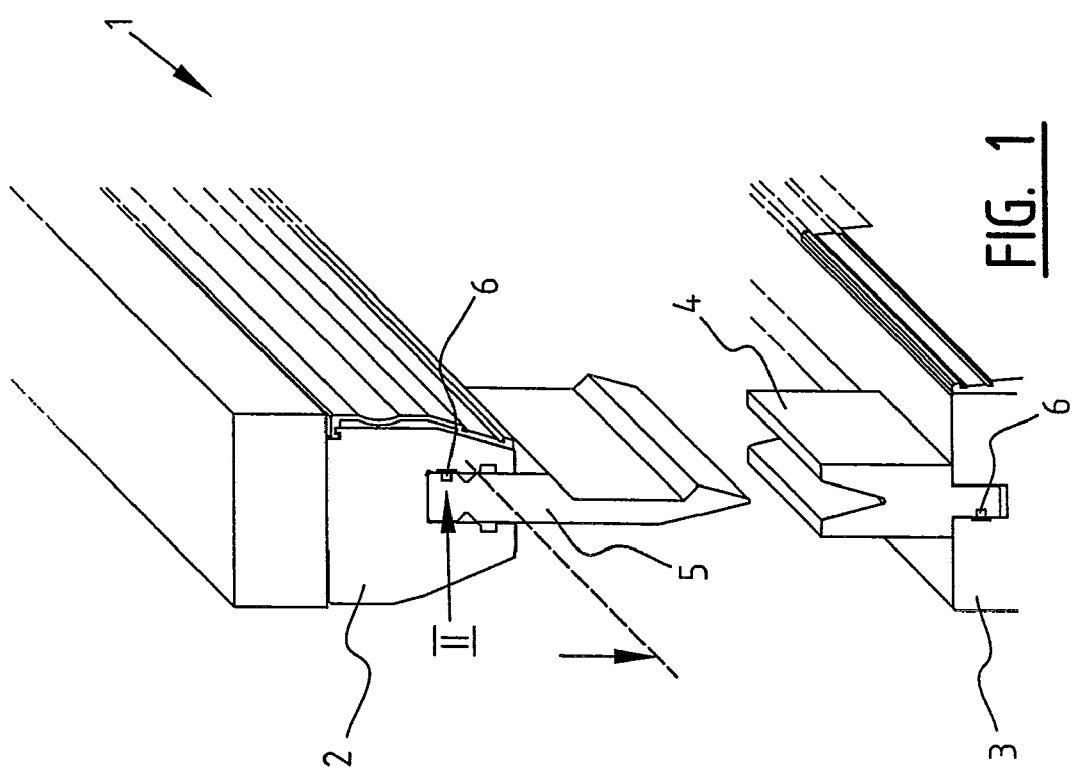
FIG. 1
FIG. 2

TOOL POSITIONING AND/OR IDENTIFICATION DEVICE AND METHOD

BACKGROUND OF THE INVENTION

1. Field of the Invention

The invention relates to a device for exchanging data such as a position or an identification between a tool and a tool receiving structure.

2. Description of Related Art

Such a device is known from the European patent application No. 1 600 257. This device is based on measuring the capacity between two adjacent discrete capacitor surfaces. When a tool is present closely to the capacitor surfaces, the position can be measured based on the measured capacity between the two surfaces. Although this device provides the necessary accuracy in determining the position of a tool in a tool receiving structure, the method is dependent on a number of variables which have to be taken into account. For example the material of which the tools are made is of influence of the measured capacity. Also the distance between the tool and the capacitor surfaces influences on the measurements and should be kept constant in order to have a reliable measurement over the full length of the tool receiving structure.

SUMMARY OF THE INVENTION

It is an object of the invention to provide a device for exchanging data between a tool and a tool receiving structure, which is more reliable and depends on less variables.

This object is achieved by a device according to the invention, which device comprises:
- an elongated track of sensors arranged in the receiving structure;
- at least one sensor activating element arranged on the tool.

The at least one sensor activating element will in use activate one or a few adjacent sensors of the track. Based on the activated sensors the position data of the tool in at least the direction of the track can be determined.

Also other data can be transferred from the tool to the receiving structure and vice versa by controlling the sensor activating element.

In a preferred embodiment of the device according to the invention the sensors are light-receptive sensors and the at least one sensor activating element comprises a light source directed to the track of sensors.

The track of light-receptive sensors provide a calibration of the length of the tool receiving structure, with which calibration it is possible to electronically detect the position of the tool. The tool radiates light in the direction of the track of sensors and the light will activate for example one sensor resulting in the detection of the position of the tool. It is also possible to use a wider light beam which illuminates for example three adjacent sensors. The accuracy of the position detection will be at least defined by the distance between two adjacent sensors. Besides position data also data from a memory on the tool can for example be exchanged.

In a very preferred embodiment the light-receptive sensors are based on organic light-emitting diode (OLED) technology. This (OLED) technology provides the possibility to produce very easily and cost effective tracks of light receptive sensors. With this (OLED) technology it is possible to manufacture sensors of very small dimensions providing an accuracy of about 50 micron.

In another embodiment of the device according to the invention, the light source comprises a reflective surface arranged on the tool and a light-emitting device arranged in the tool receiving structure emitting light directed to the reflective surface. With this embodiment the tool can be fully passive, i.e. the tool does not need to actively generate light. With the reflective surface light from a light source is reflected by the tool onto the light-receptive sensors. So with this embodiment, the light-emitting device can also be arranged in the tool receiving structure and the tool only reflects the light onto the sensors.

Preferably, the tool comprises a linear groove, in which the reflective surface is arranged. This linear groove provides for a well-defined area with which light can be reflected providing a well-defined band of light onto the light-receptive sensors. This enhances the accuracy and prevents scattered light to be reflected onto the light-receptive sensors resulting in a false detection of the position.

In another preferred embodiment the light-emitting device is an elongated track of light-emitting devices. Very preferred is the embodiment in which the track of light-emitting devices and the track of light-receptive sensors interlock. This means that a row of light-emitting devices is parallel and adjacent to a row of light-receptive sensors or that a single row of light-emitting devices and light-receptive sensors is provided in which the light-emitting devices and the light-receptive sensors alternate in the row.

Very preferred is the embodiment in which the light-emitting devices are based on organic light-emitting diode (OLED) technology. With the (OLED) technology it is simple to produce any kind of pattern of light-emitting devices and light-receptive sensors.

In yet another preferred embodiment the sensors comprise a first and second electrode and the at least one sensor activating element comprises an electrically conducting element. In this embodiment, the detection is based on the measurement of capacity. A first electrode is provided with a voltage, which causes a charge to emerge on the electrically conducting element. This charge is then measured by the second electrode, which enables the determination of the position of the tool. The advantage of this embodiment is that it is less sensitive for dirt.

Preferably the sensors have a common first electrode. This reduces the number of connections with the electrodes. Only the second electrodes have to be separately connected to determine the position of the tool.

In yet another embodiment of the device according to the invention the tool comprises a distinctive pattern of sensor activating elements activating the sensors for identifying the tool. If only a single row of sensors is present, the pattern could be for example a binary code of consecutive reflecting areas and non-reflective areas. If a number of rows of sensors is present, the pattern could for example consist out of a matrix of sensor activating elements, such as reflective and non-reflective areas.

Finally, in a further preferred embodiment the elongated track of light-receptive sensors, also comprises light-emitting devices. This provides the possibility to only provide the tool with reflective surfaces for measuring the position of the tool in the tool receiving structure and also identifying the tool based on the unique pattern of reflective areas.

The invention also relates to a method for exchanging data between a tool and a tool receiving structure, which method comprises the steps:
- providing a device according to the invention;
- activating the at least one sensor activating element; and
- checking the track of sensor for activation of a sensor.

In a preferred embodiment of the method according to the invention, the method comprises further the steps of:

controlling the activation of the at least one sensor activating element according to data signal; and detecting the data signal with the track of sensors.

By controlling the activation of the sensor activating element with a data signal it is possible to exchange data between the tool and a tool receiving structure or vice versa.

These and other features of the invention will be elucidated in conjunction with the accompanying drawings.

BRIEF DESCRIPTION OF THE SEVERAL VIEWS OF THE DRAWINGS

FIG. 1 shows a press brake with an upper tool receiving structure and a lower tool receiving structure in perspective view.

FIG. 2 shows a front-view of a tool according to FIG. 1.

DETAILED DESCRIPTION OF THE INVENTION

Figure 3:
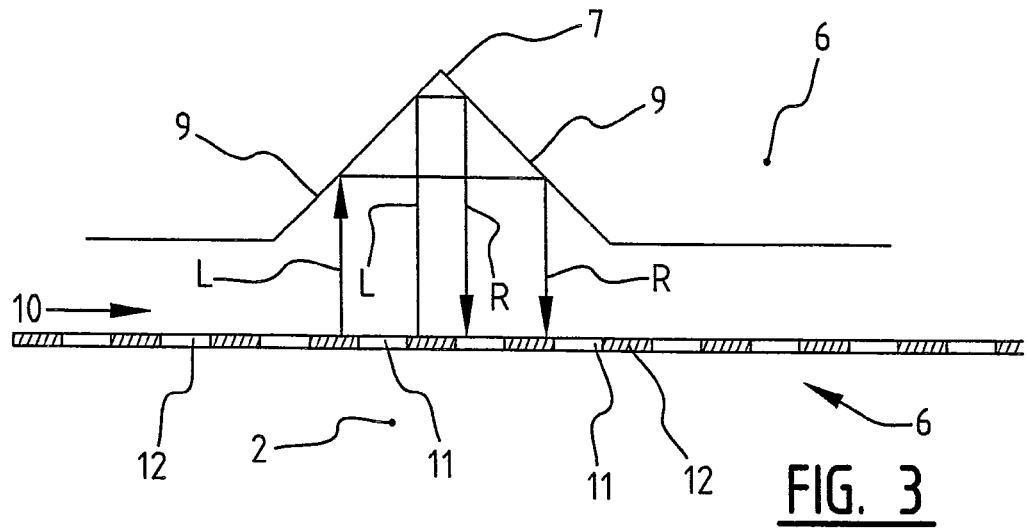
FIG. 3 shows a schematic cross-sectional view of an embodiment of the invention.

FIG. 1 shows a perspective view of a press brake 1. This press brake 1 has an upper tool receiving part 2 and a lower tool receiving part 3. The lower tool receiving part 3 has a tool 4 and the upper tool receiving part 2 has a tool 5. Both upper and lower structures 2, 3, 4, 5 are provided with means 6 for determining the position of the tool 4, 5 within the tool receiving structure 3, 2.

In FIG. 2 the tool 5 is shown in front-view. The means 6 for determining the position and identity comprise a groove 7 and a unique pattern of reflective areas 8.

With the help of FIG. 3 the determination of the position of the tool will be elucidated. FIG. 3 shows a schematic cross-sectional view of the means 6 for determining the position. This cross section is in longitudinal direction of the receiving structure shown in FIG. 1 and perpendicular to the drawing plane of FIG. 2. These means 6 could comprise for example an insert arranged in the tool 5. The groove 7 has two sloping reflective surfaces 9. The tool receiving structure 2 has an elongate linear track 10 with alternating light-receptive sensors 11 and light-emitting devices 12 being also part of the determining means 6.

The light-emitting devices 12 will emit light L in the direction of the groove 7 and its reflective surfaces 9. These reflective surfaces 9 will reflect the light R back to the elongate strip 10 of light-receptive sensors 11 and light-emitting devices 12. The reflective surfaces 9 will generate a defined beam of light on the strip 10. Depending on which light-receptive sensors 11 are activated, the position of the tool can be determined within the tool receiving structure.

Figure 4:
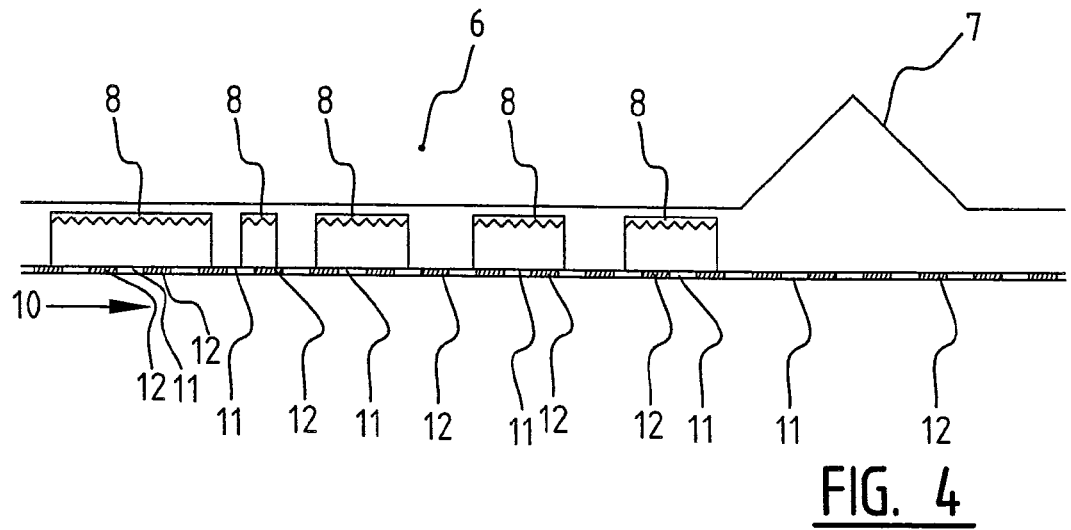
FIG. 4 shows a second cross-sectional view of the embodiment according to FIG. 3.

As is shown in FIG. 4, the reflective surfaces 8 of the unique pattern are arranged aside of the groove 7. These reflective surfaces 8 are illuminated by the light-emitting devices 12. The reflective surfaces 8 reflect the light back to the strip 10 onto the light-receptive sensors 11. Due to the unique pattern of reflective surfaces 8, the tool can be positively identified by the activated light-receptive sensors.

In FIGS. 3 and 4 a single line of alternating light-receptive sensors and light-emitting devices is shown with which for example binary codes of reflective surfaces 8 can be detected.

Figure 5:
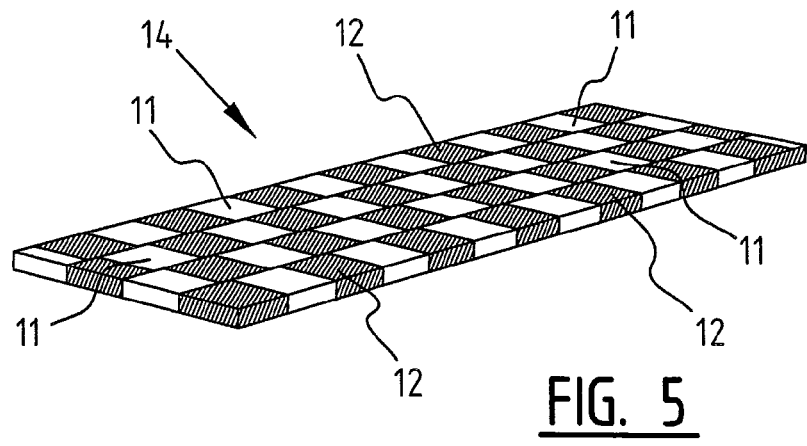
FIG. 5 shows a perspective view of a matrix with sensors and light-emitting devices.

However due to the simplicity of organic light-emitting diode (OLED) technology it is also possible to provide a matrix 14 of light-receptive sensors and light-emitting devices 12 (see FIG. 5). Such a matrix will decrease the fault tolerance, due to the staggering arrangement of rows. The matrix also improves robustness. If for example a light-receptive sensor breaks adjacent sensors will still detect light and provide information.

In stead of the shown press brake tools, the device can also be used in other tools, for example a drill or a screw tap for which it is essential to know where the thread of the tap starts.

It is also possible to arrange the light-receptive sensors on a carriage, which moves along the objects of which the position has to be determined. Such a solution could be preferable if for example the costs for the light-receptive sensors are high or if the sensors cannot be arranged in the receiving structure.

Figure 6:
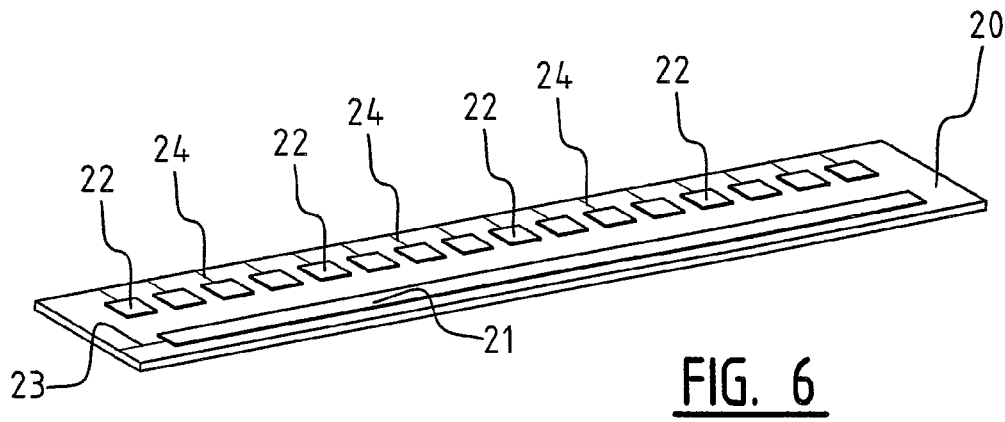
FIGS. 6 and 7 show a perspective view and top view respectively of a further embodiment according to the invention.
Figure 7:
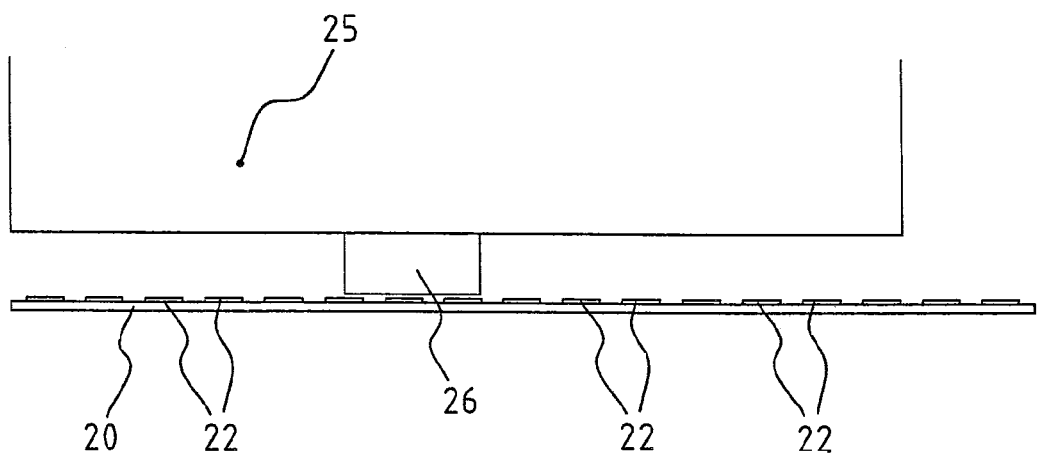

FIGS. 6 and 7 show a further embodiment of a data exchange system according to the invention.

FIG. 6 shows in perspective view a base plate 20 with a number of sensors arranged. These sensors have a common first electrode 21 and a number of separate second electrodes 22. The first electrode 21 is controlled by a signal line 23 while the separate second electrodes 22 are controlled by separate signal lines 24.

FIG. 7 shows a top-view of the base plate 20 with the electrodes 21, 22 arranged and a tool 25 arranged along side the base plate 20. On the tool 25 a sensor activating element 26 is arranged, which is in this embodiment an electrically conducting element.

In order to measure the position of the tool 25 in respect to the base plate 20 a voltage is supplied to the first electrode 21. Due to the potential between the first electrode 21 and the electric conducting element 26, a charge will be generated on the element 26. Then the capacity of each of the second electrodes 22 is measured, which is influenced by the charge of the element 26. The closer the second electrode is to the element 26 the higher the capacity and based on these measurements the position of the tool 25 can be determined in respect to the base plate 20.

Figure 8:
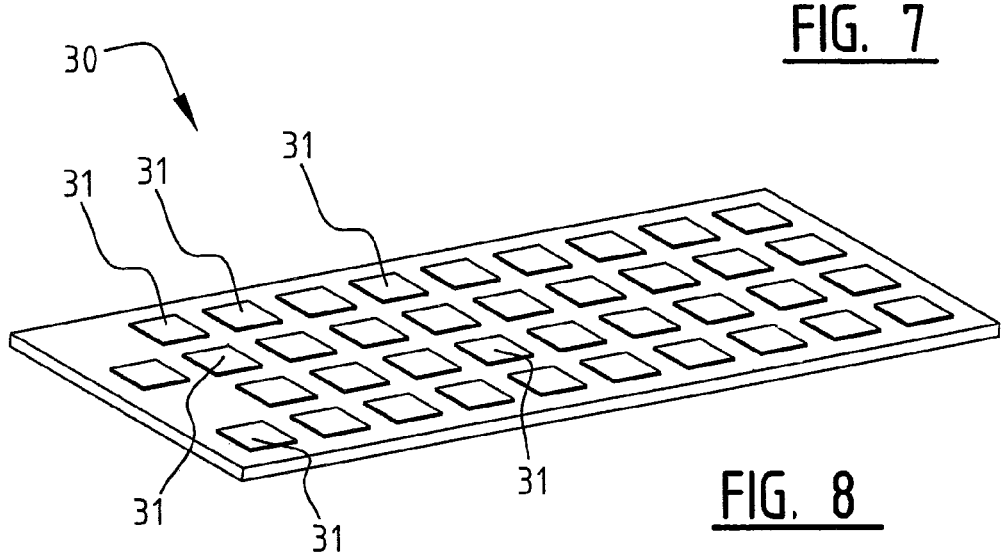
FIG. 8 shows a perspective view of a matrix of electrodes.

FIG. 8 shows a matrix 30 of electrodes 31. The electrode 31 can be used either to provide a charge or to measure the charge of adjacent electrodes 31. By controlling each separate electrode 31 a control can use the electrodes in a desired way to exchange data. For determining position data blocks of electrodes 31 can be used to virtually provide larger electrodes and to make a rough estimation of the position of a tool, while after having rough position data, single electrodes 31 can be used to more precisely determine the position.

By separately controlling the electrode 31 it is also possible to determine the identification of for example a tool. If the tool is provided with a distinct pattern, this pattern can be determined by providing some electrodes 31 with charge and using the others to determine the capacity.

It is stressed that not only position data can be determined with the invention, but also identification data or for example data present in a memory on the tool, by controlling the sensor activating elements in a suitable way and detecting the changes of the sensors.

The invention claimed is:

1. A device for exchanging data, such as a position or an identification, between a tool and a tool receiving structure, the device comprising:

an elongated linear track of sensors arranged along a recess of the tool receiving structure, wherein the elongated track of sensors comprises a plurality of light-receptive sensors and light-emitting devices; and at least one sensor activating element arranged on or along a linear groove of the tool to reflect light emitted from the plurality of light-emitting devices back towards the plurality of light-receptive sensors;

wherein the tool includes a protruding edge part for insertion into the recess of the receiving structures.

2. The device according to claim 1, wherein the at least one sensor activating element further comprises a light source directed to the elongated linear track of sensors.

3. The device according to claim 1, wherein the plurality of light-receptive sensors are based on organic light-emitting diode (OLED) technology.

4. The device according to claim 1, wherein the elongated linear track of sensors comprising the plurality of light-emitting devices and the plurality of light-receptive sensors interlock.

5. The device according to claim 1, wherein the plurality of light-emitting devices are based on organic light-emitting diode (OLED) technology.

6. The device according to claim 1, wherein the tool comprising a plurality of sensor activating elements is positioned in a distinctive pattern for identifying the tool.

7. The device according to claim 6, wherein the distinctive pattern comprises a matrix of sensor activating areas and non activating areas.

8. The device according to claim 7, wherein the sensor activating areas comprise reflective areas of light sources.

9. A device for exchanging data, such as a position or an identification, between a tool and a tool receiving structure, the device comprising:

an elongated linear track of sensors arranged along a recess of the tool receiving structure, wherein the elongated track of sensors comprises a common first electrode and a plurality of second electrodes; and at least one sensor activating element arranged on or along a linear groove of the tool, wherein the at least one sensor activating element comprises an electrically conducting element to align with and activate the first electrode;

wherein the tool includes a protruding edge part for insertion into the recess of the tool receiving structure.

10. A method for exchanging data between a tool and a tool receiving structure, the method comprising:

providing a device comprising an elongated linear track of sensors arranged along a recess of the tool receiving structure, wherein the elongated track of sensors comprises a plurality of light-receptive sensors and light-emitting devices, and at least one sensor activating element arranged on or along a linear groove of the tool to reflect light emitted from the plurality of light-emitting devices back to the plurality of light-receptive sensors, and wherein the tool includes a protruding edge part for insertion into the recess of the receiving structures;

inserting the tool into the tool receiving structure; and activating the at least one sensor activating element to determine which of the plurality of light-receptive sensors on the tool was activated.

11. The method according to claim 10, further comprising: controlling the activation of the at least one sensor activating element according to a data signal; and detecting the data signal with the track of sensors.

\* \* \* \* \*